April 7, 1953        A. M. YOUNG        2,633,924
HELICOPTER AIRCRAFT CONTROL
Filed Feb. 26, 1948
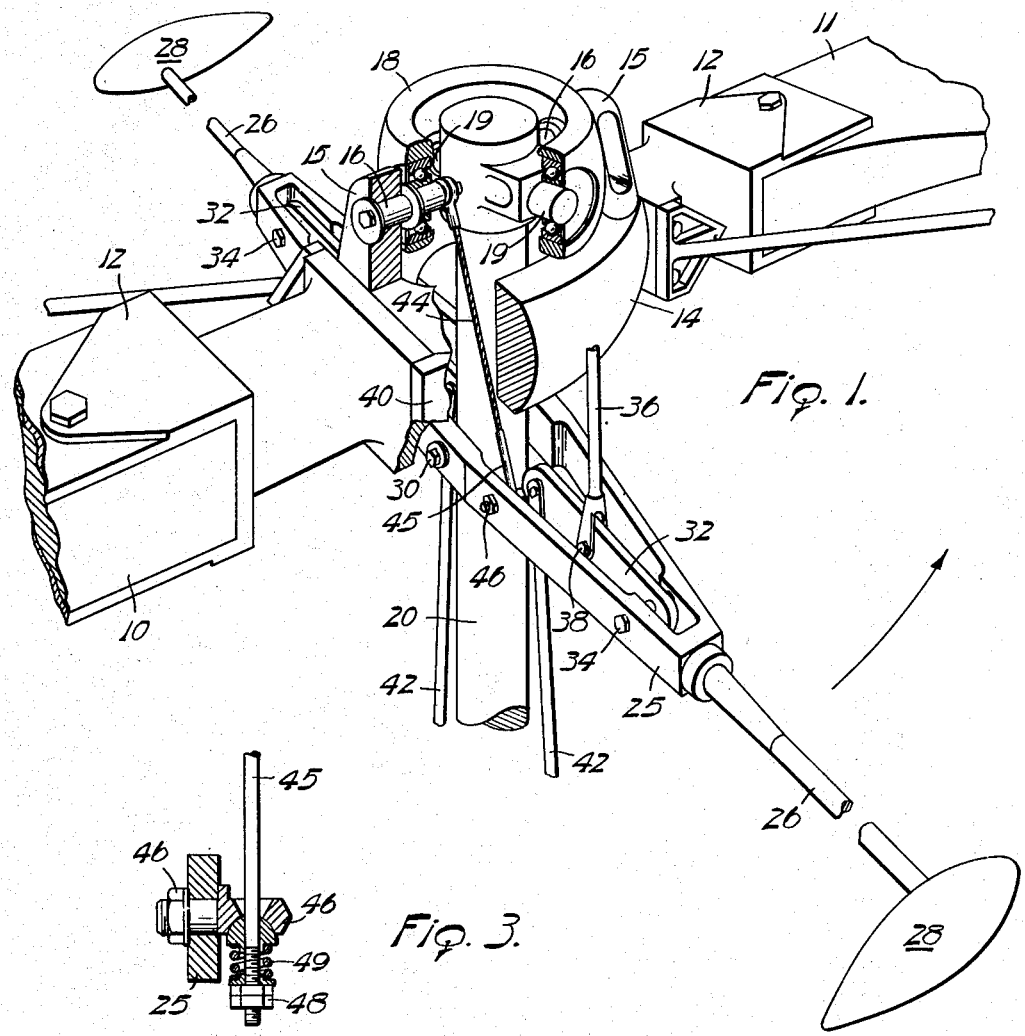
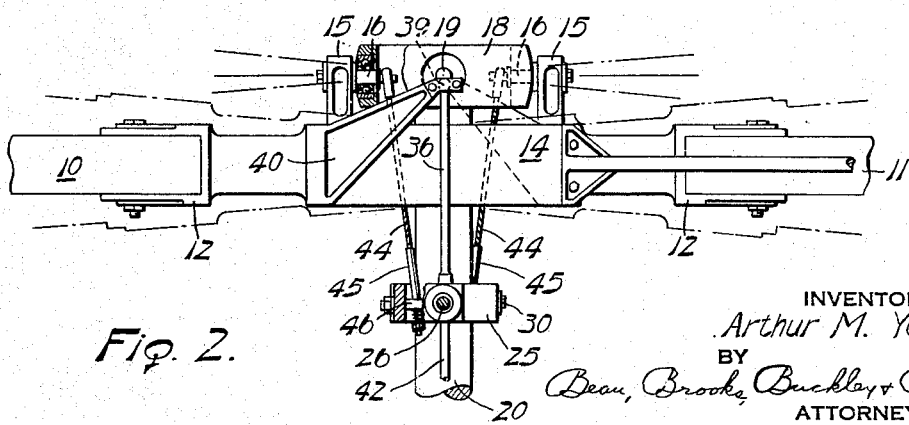
INVENTOR
*Arthur M. Young*
BY
*Bean, Brooks, Buckley & Bean*
ATTORNEYS Patented Apr. 7, 1953

2,633,924

UNITED STATES PATENT OFFICE 2,633,924

HELICOPTER AIRCRAFT CONTROL

Arthur M. Young, Paoli, Pa., assignor to Bell Aircraft Corporation, Wheatfield, N. Y.

Application February 26, 1948, Serial No. 11,260

8 Claims. (Cl. 170—160.13)

This invention relates to rotary wing aircraft, and more specifically to rotor control means for helicopter aircraft and the like.

One of the objects of the invention is to provide an improved arrangement in inertia device controlled rotor systems of the type disclosed in my prior Patents Nos. 2,368,698 and 2,384,516, whereby the degree of flapping of the rotor is automatically and effectively limited while avoiding stressing of the rotor mast and the rotor.

Another object of the invention is to provide an improved helicopter aircraft whereby the rotor is self-stabilizing relative to the aircraft, in improved manner.

Another object of the invention is to provide in helicopter aircraft a rotor stabilizing system which automatically avoids inclination of the blade tip path plane due to transverse airflow.

Another object of the invention is to achieve the objects set forth hereinabove by means of a rotor control mechanism wherein the lift forces tending to displace the rotor are employed to effect counter-control thereof.

Other objects and advantages of the invention will appear from the specification hereinafter.

In the drawing:

Fig. 1 is a fragmentary illustration in perspective, with portions broken away, of a dual blade rotor flapping control means of the invention;

Fig. 2 is a fragmentary side elevation of the rotor hub and flapping control arrangement of Fig. 1; and Fig. 3 is a fragmentary sectional view through a portion of the rotor control arrangement of Figs. 1 and 2.

The present invention relates to control arrangements in connection with a rotor of either the single blade or the diametrically opposed dual-blade type, mounted upon an aircraft body in either case by means of a connection device permitting universal inclination of the rotor. For example, as illustrated in Figs. 1-2, the rotor may comprise paired blades 10—11 rooted upon clevis arms 12—12 extending from an annular hub 14 having suspension brackets 15—15 which in turn are pivotally mounted by means of diametrically opposed pins 16—16 upon a gimbal ring 18. The ring 18 is in turn carried upon diametrically opposed pins 19—19 having their axis disposed transversely of the aligned axes of the pins 16—16; and the pins 19—19 are carried by the upper end of the rotor drive shaft 20. Thus, it will be appreciated that the blades are driven to rotate by the shaft 20 while the rotor blade and hub unit is free to incline in any direction relative to the shaft 20.

As set forth in my prior patents referred to hereinabove, a flybar as illustrated at 25 is carried by the shaft 20 to rotate therewith. As illustrated herein, the flybar comprises a shaft straddling portion 25 and extension arms 26—26 carrying at opposite ends thereof streamlined weights 28—28. The entire flybar structure is pivoted to the shaft 20 by means of a pivot pin 30 in such manner that the flybar may rock about an axis extending parallel to the long axis of the rotor structure. A pair of links 32—32 are pivotally mounted upon opposite end portions of the flybar structure 25 by means of pins 34—34, and push-pull members 36—36 (Figs. 1-2) pivotally connect at their lower ends by means of pivot pins 38—38 to the corresponding links 32—32 and extend upwardly therefrom into pivotal connections at 39 with the pitch control horns 40 (Fig. 2) which extend from the rotor hub structure 14. The free ends of the links 32—32 pivotally connect to downwardly extending push-pull control rods 42—42 which are arranged at their lower ends in any suitable connection with the aircraft pilot manual control mechanism, such as for example through means of a swash plate (not shown) as is well known in the art and illustrated for example in my prior Patent 2,368,698. Hence, upon pilot manipulation of the manual control means the push-pull members 42—42 will cause the links 32—32 to pivot, thereby actuating the push-pull members 36—36 to adjust the rotor pitch. Or, as explained in my prior patent aforesaid, assuming the control rods 42—42 to be in a given state of adjustment, any deviation of the rotor shaft 20 from the attitude thereof illustrated in Fig. 1 will result automatically in displacements of the push-pull members 36—36 because of the resistance of the flybar supported fulcrums 34—34 to corresponding shifting; whereby attitude corrective adjustments of the pitch of the rotor blades will be automatically obtained.

The rotor hub 14 carries a rotor flapping limiting device which is illustrated to comprise a pair of tension cables 44—44 each of which is conveniently fixed at one end to an extension of the corresponding pin 16 so as to be pulled upwardly therewith whenever the corresponding end of the rotor rises in relation to the plane of rotation of the flybar 25. At its lower end each cable 44 is fitted with a rod 45 which is slip-fitted through an eye bracket 46 extending from the flybar 25 at the end thereof which leads the blade supporting the upper end of the cable, considering the direction of rotation of the rotor as indicated by the arrow in Fig. 1. At its lower end the cable rod 45 is screwthreaded to carry a nut 48, and a compression spring 49 is disposed between the nut 48 and the bracket 46 so as to provide an elastic connection between the rotor and the flybar. It will be understood that the positions of the connections at opposite ends of the cables 44—44 relative to the axes of the pins 19—19 and to the flybar pivot device 30, as well as the amount of slackness or lost motion included in the cable system will be regulated to provide the desired degree of control sensitivity for the system, as will be explained more fully hereinafter.

The rotor flapping control arrangement of the invention is adapted to function automatically to limit the flapping of the rotor while avoiding stressing of the rotor and mast structure. For example, whereas the rotor mast or drive shaft 20 is normally disposed in vertical attitude and the rotor is turning thereon in undisturbed state, if the rotor shaft is then caused to incline upwardly toward the blade 10 as viewed in Fig. 2 the cable 44 at the right hand side of the figure will be thereby pulled down upon. If the disturbance causing such shifting of the rotor shaft relative to the blade structure is sufficient to cause the spring at the lower end of the cable to collapse thereby transmitting the pull to the far end of the flybar 25 as viewed in Fig. 1, such pull upon the flybar will force it to precess into another plane of rotation which is tilted in a direction at right angles to the direction of the cable pull. This operation occurs in accord with the action of gyroscopic bodies, whereby the maximum displacement of the plane of rotation of a mass occurs at a position 90° later than the position of the application of the displacing impact.

Therefore, when the blade 11 reaches a 90° advanced position relative to its position at the time of the displacement impact it will have been adjusted by operation of the linkage elements 32—36 to an increased angle of attack which will automatically increase the lift forces acting thereon, thereby causing the blade 11 to rise during the next 90° quadrant of its rotation. Then, when the blade 11 reaches the position occupied by blade 10 in Fig. 1, the blade 11 will be at an elevation above the elevation of blade 10 as shown in Fig. 1; and this mode of control action will continue automatically so as to at all times maintain the rotor tip path plane substantially perpendicular to the shaft 20.

Thus, it will be appreciated that the invention provides protection for the rotor mast and blade structure against shocks and/or bending loads such as normally result from excessive flapping of a helicopter rotor blade structure under operative conditions, and also provides the rotor to be self-stabilizing relative to the aircraft and avoids inclination of the rotor blade tip path plane due to transverse airflow. It will also be understood that whereas only one form and application of the invention has been illustrated and described in detail hereinabove, the invention is not so limited but that various changes may be made therein without departing from the spirit of the invention or the scope of the appended claims.

I claim:

1. A rotor comprising a driving shaft, a blade extending radially of said shaft, hub means mounting said blade on said shaft for universal pivotation thereon whereby said blade is rotatable about its longitudinal axis for pitch change adjustments and inclinable about a transverse axis, a rotating inertia device mounted upon said shaft to be pivotable thereon about an axis parallel to said longitudinal axis, means interconnecting said inertia device and said blade for rocking the latter about said longitudinal axis in response to pivoting of said inertia means relative to said shaft, and an inclination limiting device for limiting inclination of said hub relative to said shaft about said transverse axis of said blade, said limiting device comprising a lost motion connection means coupled to said hub at a position on said hub within the vertical plane of said longitudinal axis and coupled to said inertia device at a position thereon planwise circumferentially displaced 90° ahead of the longitudinal axis of said blade in view of the direction of the rotor rotation.

2. A rotor comprising a driving shaft and a hub mounted on said shaft for universal inclination thereto, a blade unit comprising a pair of rotor blades extending from said hub in relatively rigid diametrically opposed radially extending attitude whereby the longitudinal axis of said blades defines a blade pitch change axis, rotating inertia means linked to said hub to change the pitch of said blade unit in response to shifting of the plane of blade unit rotation, and a limiting device for limiting inclination of said blade unit relative to said shaft about an axis transverse to said pitch change axis, said limiting device comprising a connection member extending between said inertia means and said hub at a position on said hub planwise circumferentially displaced approximately 90° rearwardly from the position of connection to said inertia means in view of the direction of the blade unit rotation.

3. A rotor comprising a driving shaft, a blade extending radially of said shaft, hub means mounting said blade on said shaft for universal pivotation thereon whereby said blade is rotatable about its longitudinal axis for pitch change adjustments and inclinable about a transverse axis, a rotating inertia device mounted upon said shaft to be pivotable thereon about an axis parallel to said longitudinal axis, means interconnecting said inertia device and said hub for rocking the latter about said longitudinal axis in response to pivoting of said inertia means relative to said shaft, and an inclination limiting device for limiting inclination of said hub relative to said shaft about said transverse axis of said blade, said limiting device comprising a connection means coupled to said hub at a position thereon within the vertical plane of said longitudinal axis and coupled to said inertia device at a position thereon planwise circumferentially displaced 90° ahead of the longitudinal axis of said blade in view of the direction of the rotor rotation.

4. A rotor comprising a driving shaft and a hub mounted on said shaft for universal inclination thereto, a blade unit comprising a pair of rotor blades extending from said hub in relatively rigid diametrically opposed radially extending attitude whereby the longitudinal axis of said blades defines a blade pitch change axis, rotating inertia means linked to said blade unit to change the pitch of the latter in response to shifting of the plane of blade unit rotation, and a limiting device for limiting inclination of said blade unit relative to said shaft about an axis transverse to said pitch change axis, said limiting device comprising a lost motion connection means extending between and coupled to said inertia means and said hub at a position on said hub planwise circumferentially displaced approximately 90° rearwardly from the position of connection to said inertia means in view of the direction of the blade unit rotation.

5. A rotor unit mounted upon a driving shaft having a transverse pivot connection device, said rotor unit including a gimbal ring mounted upon said connection device for inclination relative to said shaft, a hub mounted upon said gimbal ring by means of a pivot means having an axis at right angles to said transverse pivot connection device, a pair of rotor blades extending from said hub in relatively rigid diametrically opposed radially extending attitude and at right angles to said transverse pivot connection device, a rotating inertia device mounted upon said shaft to rock thereon about an axis parallel to said pivot means axis, means interconnecting said inertia device and said hub for pivoting the latter about the axis of said pivot means in response to rocking of said inertia means relative to said shaft, and an inclination limiting device carried by said rotor unit for limiting inclination thereof relative to said shaft about said transverse pivot connection device, said limiting device being coupled to said hub at a position in the planview line of said pivot means axis and to said inertia device at a position thereon circumferentially displaced 90° ahead of said pivot means axis in view of the direction of the rotor unit rotation.

6. A rotor unit mounted upon a driving shaft having a transverse pivot connection device, said rotor unit including a gimbal ring mounted upon said connection device for inclination relative to said shaft, a hub mounted upon said gimbal ring by means of a pivot means having an axis at right angles to said transverse pivot connection device, a pair of rotor blades extending from said hub in relatively rigid diametrically opposed radially extending attitude and at right angles to said transverse pivot connection device, a rotating inertia device mounted upon said shaft to rock thereon about an axis parallel to said pivot means axis, connection means coupling said inertia device and said hub for pivoting the latter about the axis of said pivot means in response to rocking of said inertia means relative to said shaft, and an inclination limiting device carried by said rotor unit for limiting inclination thereof relative to said shaft about said transverse pivot connection device, said limiting device comprising a lost motion connection means coupled to said rotor unit at a position in the planview line of said pivot means axis and to said inertia device at a position thereon circumferentially displaced 90° ahead of said pivot means axis in view of the direction of the rotor unit rotation.

7. In a helicopter, a rotor comprising a vertical driving shaft and a hub mounted on said shaft for universal inclination thereto, a rotor unit comprising a pair of rotor blades extending horizontally from said hub in diametrically opposed relation thereon, an inertia means rotating with said rotor unit and extending therefrom at right angles to said rotor unit, and a rotor unit flapping limit means for limiting flapping inclination of the rotor unit relative to said shaft, said limit means comprising a lost motion connection device extending between said hub and said inertia means and coupled thereto at positions eccentrically of said shaft and relatively displaced circumferentially of the rotor arc approximately 90°.

8. In a helicopter aircraft, a dual bladed lift rotor, a lift rotor support mechanism including a drive shaft and a lift rotor mounting device having a rotor flapping pivot axis intersecting the axis of said drive shaft, a control arm mounted upon said shaft to rotate therewith and to rock thereon about an axis transverse to said flapping pivot axis, rotor blade pitch change control means connected to said control arm and to said lift rotor blades for adjusting the pitch of said lift rotor blades in response to rocking of said control arm relative to said shaft, and rotor flapping limit means comprising a linkage device including a lost motion connection device interconnecting said lift rotor mounting device and said control arm, said limit means being operable upon flapping of said lift rotor about said flapping pivot axis beyond a predetermined degree to adjust the pitch of the rotor blades to provide a flapping corrective influence.

ARTHUR M. YOUNG.

REFERENCES CITED

The following references are of record in the file of this patent:

UNITED STATES PATENTS

| Number | Name | Date |
|---|---|---|
| 1,800,470 | Ochmichen | Apr. 14, 1931 |
| 2,153,610 | Campbell | Apr. 11, 1939 |
| 2,368,698 | Young | Feb. 6, 1945 |
| 2,384,516 | Young | Sept. 11, 1945 |
| 2,415,148 | Sikorsky | Feb. 4, 1947 |
| 2,429,502 | Young | Oct. 21, 1947 |
| 2,457,429 | Young | Dec. 28, 1948 |

FOREIGN PATENTS

| Number | Country | Date |
|---|---|---|
| 34,123 | France | Nov. 20, 1928 |
| | (2nd Edt. of 631,596) | |